(12) United States Patent
Hoffmann et al.

(10) Patent No.: US 7,258,351 B2
(45) Date of Patent: Aug. 21, 2007

(54) QUICK-ACTION CHUCK

(75) Inventors: Erhard Hoffmann, Leinfelden-Echterdingen (DE); Joachim Hecht, Magstadt (DE); Siegfried Keusch, Deizisau (DE)

(73) Assignee: Robert Bosch GmbH, Stuttgart (DE)

( * ) Notice: Subject to any disclaimer, the term of this patent is extended or adjusted under 35 U.S.C. 154(b) by 394 days.

(21) Appl. No.: 10/814,756

(22) Filed: Mar. 31, 2004

(65) Prior Publication Data

US 2004/0251641 A1 Dec. 16, 2004

(30) Foreign Application Priority Data

Apr. 4, 2003 (DE) ............... 103 15 407
Mar. 13, 2004 (DE) ............. 10 2004 012 434

(51) Int. Cl.
*B23B 31/16* (2006.01)
*B23B 31/103* (2006.01)

(52) U.S. Cl. ............... 279/60; 279/65; 279/140

(58) Field of Classification Search ............ 279/60, 279/65, 140, 58, 61, 62, 902
See application file for complete search history.

(56) References Cited

U.S. PATENT DOCUMENTS

| | | | | |
|---|---|---|---|---|
| 1,907,553 A * | 5/1933 | Lundin | ............ | 279/55 |
| 2,253,345 A * | 8/1941 | Palmgren | ............ | 279/60 |
| 2,544,088 A | 3/1951 | Hollis | | |
| 4,627,626 A * | 12/1986 | Rohm | ............ | 279/145 |
| 4,627,627 A * | 12/1986 | Rohm | ............ | 279/19.3 |
| 4,682,918 A * | 7/1987 | Palm | ............ | 408/241 R |
| 4,701,083 A * | 10/1987 | Deutschenbaur et al. | ... | 408/240 |
| 4,711,457 A * | 12/1987 | Wezel | ............ | 279/65 |
| 4,968,191 A * | 11/1990 | Palm | ............ | 408/124 |
| 5,199,833 A * | 4/1993 | Fehrle et al. | ............ | 408/239 R |
| 5,375,857 A * | 12/1994 | Rohm | ............ | 279/62 |
| 5,499,829 A * | 3/1996 | Rohm | ............ | 279/62 |
| 5,624,125 A | 4/1997 | Roehm | | |
| 5,741,016 A | 4/1998 | Barton et al. | | |
| 5,921,563 A * | 7/1999 | Huggins et al. | ............ | 279/131 |
| 6,247,706 B1* | 6/2001 | Kuo | ............ | 279/62 |
| 6,257,596 B1* | 7/2001 | Yang | ............ | 279/62 |
| 6,260,857 B1* | 7/2001 | Wienhold et al. | ............ | 279/62 |
| 6,505,840 B2* | 1/2003 | Huggins et al. | ............ | 279/61 |
| 6,691,799 B2* | 2/2004 | Kuhnle et al. | ............ | 173/132 |
| 6,843,484 B2* | 1/2005 | Schroeder | ............ | 279/60 |
| 2004/0080083 A1 | 4/2004 | Czado | | |
| 2004/0195784 A1* | 10/2004 | Hoffmann et al. | ............ | 279/60 |
| 2005/0023774 A1* | 2/2005 | Mack | ............ | 279/60 |

FOREIGN PATENT DOCUMENTS

DE 347 557 1/1922
DE 3501870 A1 * 7/1986

(Continued)

*Primary Examiner*—Monica Carter
*Assistant Examiner*—Michael W. Talbot
(74) *Attorney, Agent, or Firm*—Michael J. Striker

(57) ABSTRACT

A quick-action chuck, in particular for a power tool, has an actuating element (20) and a control device which includes at least one mechanism (12, 22, 36, 42, 50) for controlling at least one locking device (10) that serves to absorb a chucking reinforcement force via the locking device (10) that is controllable by the control device, a positive-engagement connection can be brought about for absorbing the chucking reinforcement force.

12 Claims, 6 Drawing Sheets

FOREIGN PATENT DOCUMENTS

| | | |
|---|---|---|
| DE | 3510020 A1 * | 9/1986 |
| DE | 101 09 474 C1 | 6/2002 |
| DE | 10109490 A1 * | 9/2002 |
| EP | 1 380 372 A1 | 1/2004 |
| GB | 191959 * | 1/1923 |

* cited by examiner

QUICK-ACTION CHUCK

CROSS-REFERENCE

The invention described and claimed hereinbelow is also described in DE 103 15 407.8, filed Apr. 4, 2003 and DE 10 2004 012434.5, filed Mar. 13, 2004. This German Patent Application, whose subject matter is incorporated here by reference, provides the basis for a claim of priority of invention under 35 U.S.C. 119 (a)-(d).

BACKGROUND OF THE INVENTION

The invention is based on a quick-action chuck.

From German Patent Disclosure DE 10109490 A1, a quick-action chuck of this generic type for a power tool is known which has a control device for controlling locking devices which serve to absorb a chucking reinforcement force. The quick-action chuck has an axially displaceable actuating element, which is coupled with a pivotably supported knob of the control device. If the actuating element is displaced rearward, in an axial direction remote from a receptacle region of the quick-action chuck, the knob is pivoted, as a result, via a transmission means, a nonpositive-engagement connection for absorbing the chucking reinforcement force is brought about between the locking devices, embodied by cup springs, and a base body of the quick-action chuck.

SUMMARY OF THE INVENTION

The invention is based on a quick-action chuck, in particular for a power tool, having an actuating element and having a control device which includes at least one means for controlling at least one locking device that serves to absorb a chucking reinforcement force.

It is proposed that a positive-engagement connection for absorbing the chucking reinforcement force can be brought about via the locking device which is controllable by the control device. An especially convenient and easily operated quick-action chuck can be achieved. Major actuation forces for the nonpositive fixation of the locking device can be avoided, and low wear of the locking device over a long service life can be achieved. A high impact drilling strength can be achieved, or a tool can be securely fastened with a strong clamping force, suitable for impact drilling operation, in the quick-action chuck. Moreover, a defined order of method steps can be assured in a simple way, and as a result an actuating device in multiple parts and/or complicated actuation sequences that a user must go through can be avoided.

Preferably, the locking device for establishing the positive-engagement connection is rotatable relative to a base body, and in particular is rotatable in the circumferential direction. Accordingly, the positive-engagement connection can be brought about a rotation of the locking device.

A secure, reliable control of the locking device can be attained if the means is formed by a locking spring. The locking spring can be formed by various types of spring that appear suitable to one skilled in the art, such as a helical compression spring and so forth. However, if the locking spring has an essentially annular shape, it can be integrated in an especially space-saving way.

If the tool can be clamped indirectly by way of a spring means that is actuatable by the actuating element, then the reliability of the chuck can be increased. If the spring means for indirectly clamping the tool has an essentially annular shape, then the arrangement is relatively invulnerable to dust. For that purpose, the spring means favorably has at least two detent elements, opposite one another circumferentially, for snapping into the actuating element. Tool diameters of very different sizes can advantageously be chucked, ranging for instance from 1.5 mm up to 13 mm.

In a favorable refinement of the invention, the actuating element can be operatively uncoupled from a locking device over at least once actuation region. Close tolerances with the attendant unwanted effects, such as high production costs, vulnerability to dirt, and so forth, can be avoided. Advantageously, locking can be done first and then chucking. A structurally simple embodiment can be attained in particular if the actuating element can be coupled to the means and uncoupled via a locking spring.

If the actuating element for chucking a tool is supported rotatably, then advantageous gear ratios can be attained structurally simply, in particular via threaded connections, and major clamping forces can be achieved with low actuation forces. By means of the control device, it is simple to attain that the actuating element advantageously needs to be rotated less than 250° for the chucking, making especially convenient chucking of a tool attainable. In principle, however, it is also conceivable to use lever mechanisms and so forth, instead of threaded connections.

Advantageously, the actuating element is supported displaceably in the axial direction, and a result an axial actuation is associated with a fast adjustment, and simple, self-explanatory use can be attained. Advantageously, the base body has at least one slide face, on which the locking device is axially displaceable.

In a further feature, it is proposed that the quick-action chuck has at least one chucking jaw that is loaded in the axial direction via a spring element in at least one operating position. An automatic closure of the quick-action chuck up to a certain degree can be attained, and convenience can be enhanced. Favorably, it can be provided that the quick-action chuck has at least one chucking jaw that in at least one operating position is loaded via a means in the radial direction, in particular radially inward. Thus unwanted seizing of the chucking jaw can be reliably avoided. The means may be embodied by a transmission means with an oblique face and/or a spring means, and so forth.

In addition, a power tool with a quick-action chuck is proposed in which a tool can be chucked via a spring means that is actuatable by the actuating element. The invention can be employed especially advantageously in power drills, power impact drills, and/or power screwdrivers.

BRIEF DESCRIPTION OF THE DRAWINGS

Further advantages will become apparent from the ensuing description of the drawing. In the drawing, one exemplary embodiment of the invention is shown. The drawing, description and claims include numerous characteristics in combination. One skilled in the art will expediently consider the characteristics individually as well and put them together to make useful further combinations.

Shown are.

DETAILED DESCRIPTION OF THE EXEMPLARY EMBODIMENT

Figure 1:
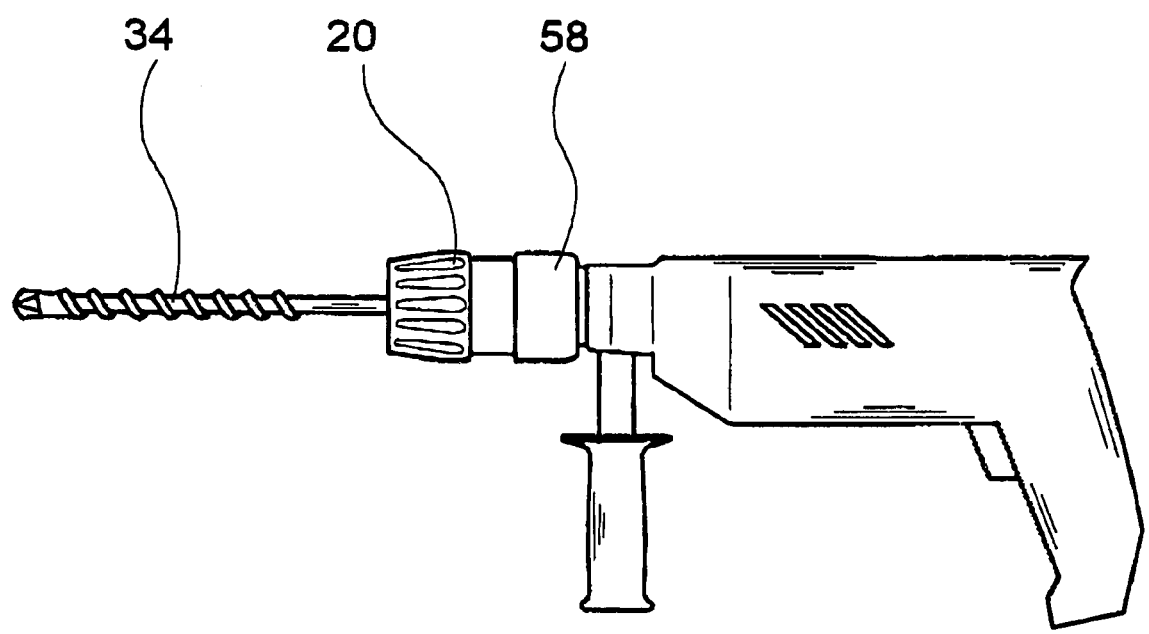
FIG. 1, a power impact drill, with a quick-action chuck of the invention.

FIG. 1 shows a power impact drill with a quick-action chuck of the invention, with a tool 34 that can be locked and chucked with the aid of an actuating element 20. The actuating element 20 is surrounded in some regions by a covering bush 58.

In the drawings, components that are substantially identical are identified by the same reference numerals through the description.

The quick-action chuck described in detail below in conjunction with FIGS. 2 through 8 has an actuating element 20, which can be operatively uncoupled, over an actuation region, from a fixation bush 36, in which locking devices 10 are retained, the uncoupling being done specifically via a locking spring 22 (FIG. 4) embodied by a bandlike spring steel, which has an essentially annular shape and is disposed in a circumferential groove of the fixation bush 36. The fixation bush 36 surrounds a base body 32 and on its end near the tool it has a smaller circumference than on its end remote from the tool. "Near" and "remote from" the tool are understood to mean the region of the fixation bush 36 that is located close to or away from the installed tool 34, that is, near or far from chucking jaws 36 that are provided for the tool 34. On the end near the tool, the fixation bush 36 is surrounded by a chucking bush 50 embodied as a nut. Adjacent the end of the fixation bush 36 near the tool, there is an axial bearing 52, which in turn adjoins a guide bush 42.

On the end of the fixation bush 36 remote from the tool, both its outer circumference and its inside diameter are increased, and a step-shaped enlargement is embodied approximately in the axial center of the fixation bush 36. In the hollow space thus formed between the base body 32 and the fixation bush 36, one or more locking devices 10 are disposed on the circumference of the base body 32. On its end remote from the tool, the fixation bush 36 fits around a retaining ring 44, which in conjunction with a securing ring 46 prevents the locking devices 10 from falling out. Adjoining the step on the widened circumference, the fixation bush 36 is surrounded by a spring means 12, embodied as a detent spring, whose function will be described in further detail below in conjunction with FIG. 5.

If the actuating element 20, viewed in the direction toward its free end, is in a defined terminal position associated with an open position, then the locking devices 10 are located above a slide face, not identified by reference numeral, of the base body 32. In the circumferential direction, two locking devices 10, for instance offset by 180° from each other, are disposed above corresponding slide faces.

If the tool 34 is to be introduced into the quick-action chuck, the actuating element 20 is pulled axially to the rear, in the direction away from the free end, as a result of which, via the guide bush 42, chucking jaws 26 coupled by positive engagement to the actuating element 20 in the axial direction are guided, in the direction away from the free end, to the rear and radially outward. The chucking jaws 26 open, and the tool 34 can be inserted.

The guide bush 42 is supported axially displaceably on the base body 32 and is connected to the base body 32 in a manner fixed against relative rotation via a tongue and groove connection, not shown. It is also possible for the guide bush 42 to be supported rotatably on the base body 32 and for a tangential guidance of the guide bush 42 to be achieved via the chucking jaws 26.

Once the tool 34 has been introduced between the chucking jaws 26 and the actuating element 20 has been let go by the user, the actuating element is thrust in the direction of the free end of the quick-action chuck via a spring element 24 embodied as a helical compression spring. The spring element 24 embodied as a helical compression spring is braced on the covering bush 58 and acts, via the retaining ring 44, on the actuating element 20, which in turn acts on the chucking jaws 26 with an axial force, via the axial bearing 52 and the guide bush 42. As a result of the axial force, the chucking jaws 26 are guided radially inward along oblique faces of recesses in the base body 32 and secure the tool 34 with a low clamping force.

Figure 2:
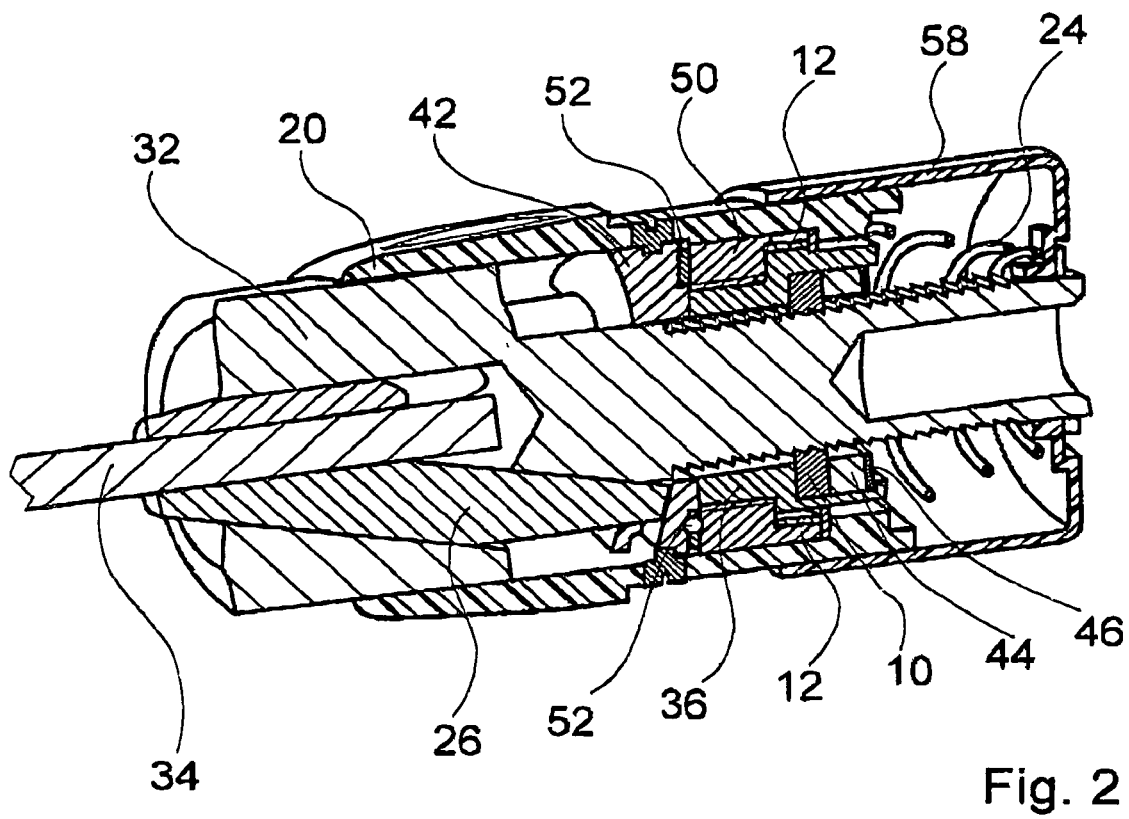
FIG. 2, a longitudinal section through a quick-action chuck of the invention obliquely from above, with a tool that has a small diameter.
Figure 3:
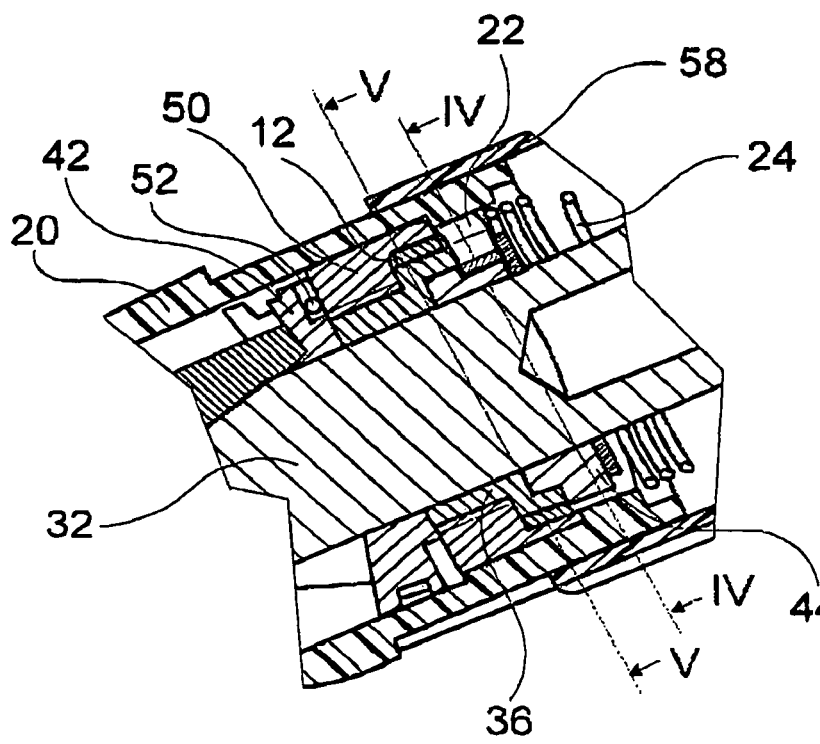
FIG. 3, a detail of the quick-action chuck of FIG. 2, with a visible spring means, for chucking the tool.

In FIG. 3, a detail of the quick-action chuck of FIG. 2 is shown. The arrangement is rotated such that both the spring means 12 for chucking the tool and the locking spring 22, which serves to lock the locking devices 10, are visible.

With respect to characteristics and functions that remain the same, the description of the exemplary embodiment of FIG. 2 can be referred to in principle. The essentially annular locking spring 22 is passed radially inward through the fixation bush 36.

Figure 4:
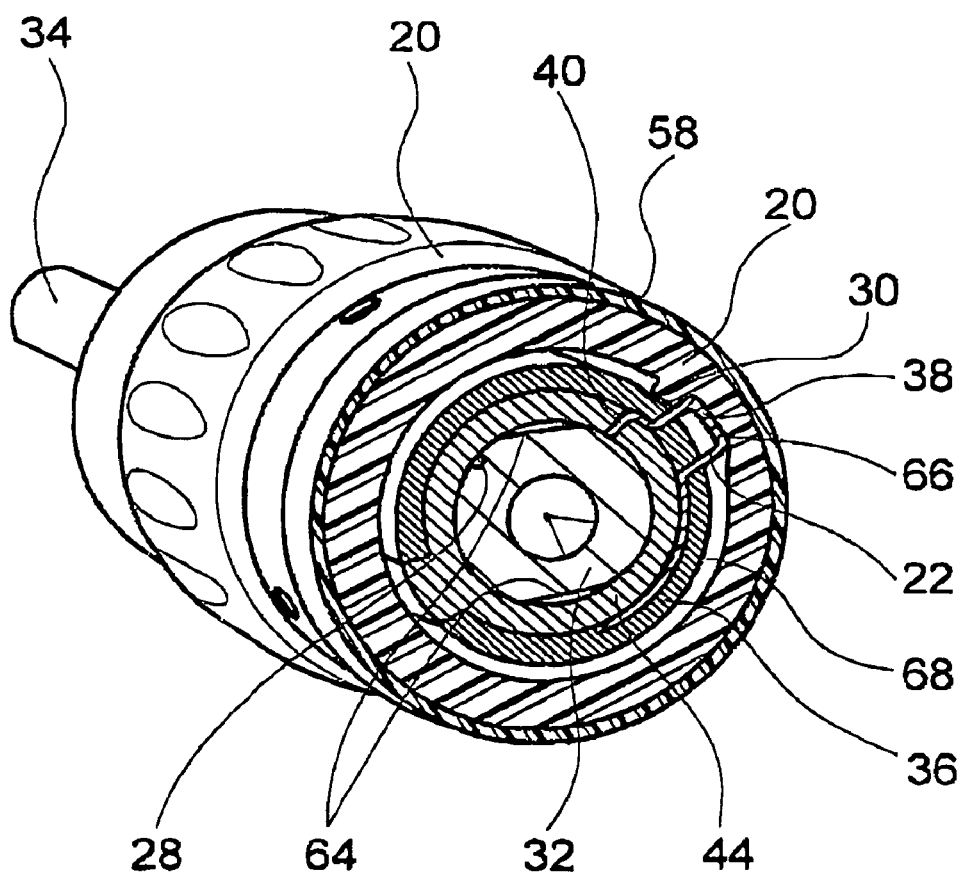
FIG. 4, a cross section through the quick-action chuck taken along the line IV-IV.
Figure 9:
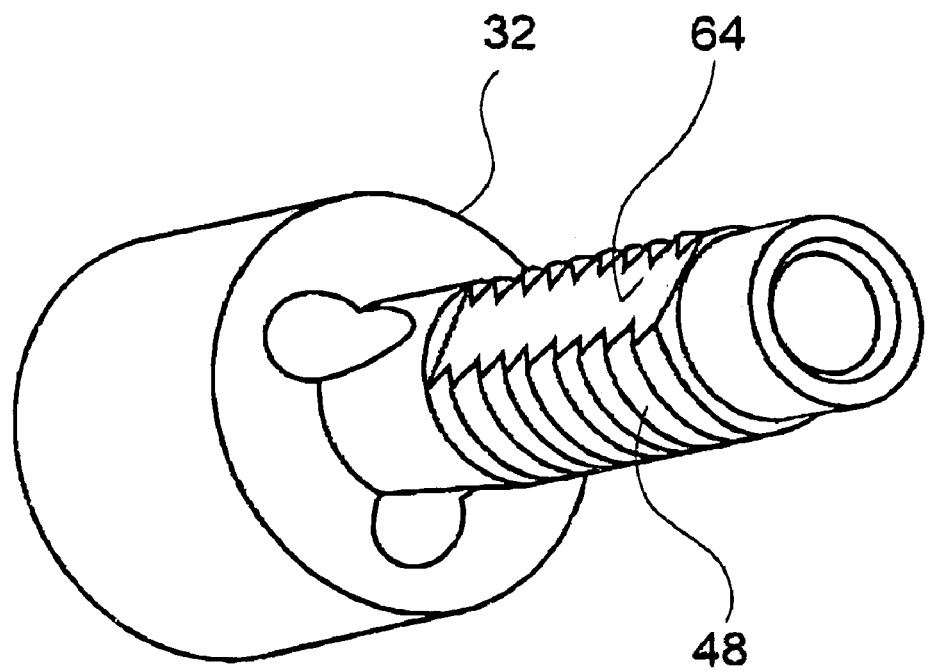
FIG. 9, an elevation view of a preferred base body.

FIG. 4 shows a cross section through the quick-action chuck taken along the line IV-IV in FIG. 3; the viewing direction is from the end of the fixation bush 36 far from the tool toward the end near the tool. By counterclockwise rotation of the actuating element 20, the fixation bush 36 is rotated via the locking spring 22, which is retained in a groove 66 in the actuating element 20, and the locking devices 10 are thus displaced along the circumference of the base body 32. A lug 30 forms a stop for the locking spring 22 in the groove 66. In the release position, the locking devices 10 rest on a slide face 64 of the base body 32, on which they are axially displaceable. The chucking bush 50 likewise rotates in the process. Finally, the locking devices 10 engage a set of teeth 48 of the base body 32 (FIG. 9). As a result of meshing with the set of teeth 48, the locking devices 10 are axially fixed on the base body 32.

As soon as the locking spring 22, with its finger 40, can snap into a groove 28 in the base body 32, a protrusion 38 of the locking spring 22, driven by the actuating element 20, snaps out of the groove 66 and enters a trailing groove 68. The parts built into the fixation bush 36 are now fixed both axially and radially to the base body 32 via the locking spring 22.

Figure 5:
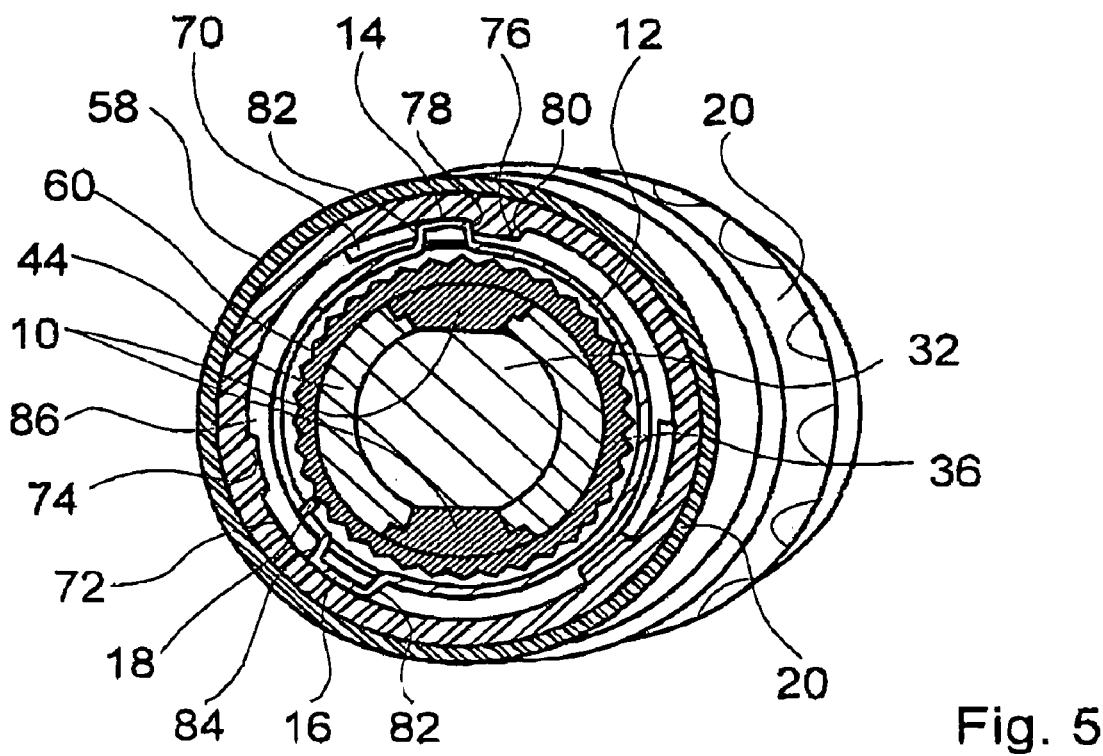
FIG. 5, a cross section through the quick-action chuck taken along the line V-V.

Upon further rotation of the actuating element 20, now only the chucking bush 50 is driven via the spring element 12 embodied as a detent spring, as explained in further detail in FIG. 5, which shows a cross section through the quick-action chuck taken along the line V-V of FIG. 3.

The spring means 12 embodied essentially annularly as a detent spring has two detent elements 14, 16, approximately opposite one another on the circumference of the base body 32. The detent element 14 engages a groove 70 in the actuating element 20 and, with its side on the right in the drawing, rests on an edge 78 of a lug 76 of the actuating element 20, which has a further edge 80 that is remote in the circumferential direction from the detent element 14. The second detent element 16 engages a groove 72 in the actuating element 20 and has a first stop 82 and a second stop 84. Remote from the detent element 16, the groove 72 is defined by an edge 74 of a lug 86.

Figure 6:
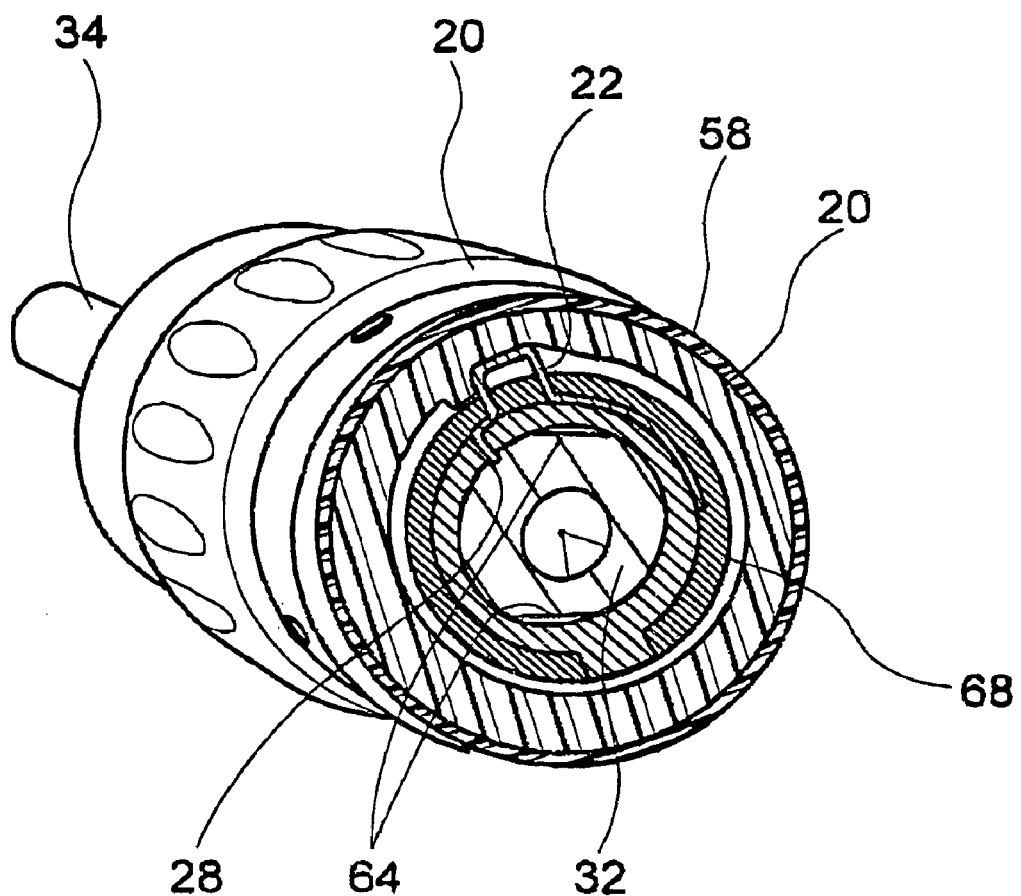
FIG. 6, a cross section through the quick-action chuck of FIG. 4, with the locking spring snapped into place.

If as described in conjunction with FIG. 3 the locking spring 22 has engaged the groove 28 in the base body 32, then the actuating element 20, for manually chucking the tool 34 with a clamping force appropriate for operation, is rotated onward counterclockwise, viewed in the direction of the free end. This situation is shown in FIG. 6, analogously to FIG. 4. The locking spring 22 has snapped into the groove 28 of the base body 32, whereupon the locking devices 10 are fixed both axially and radially.

Now only the chucking bush 50 can be driven by the actuating element 20 via the spring element 24 embodied as a detent spring. The chucking of the tool 34 thus begins.

Figure 7:
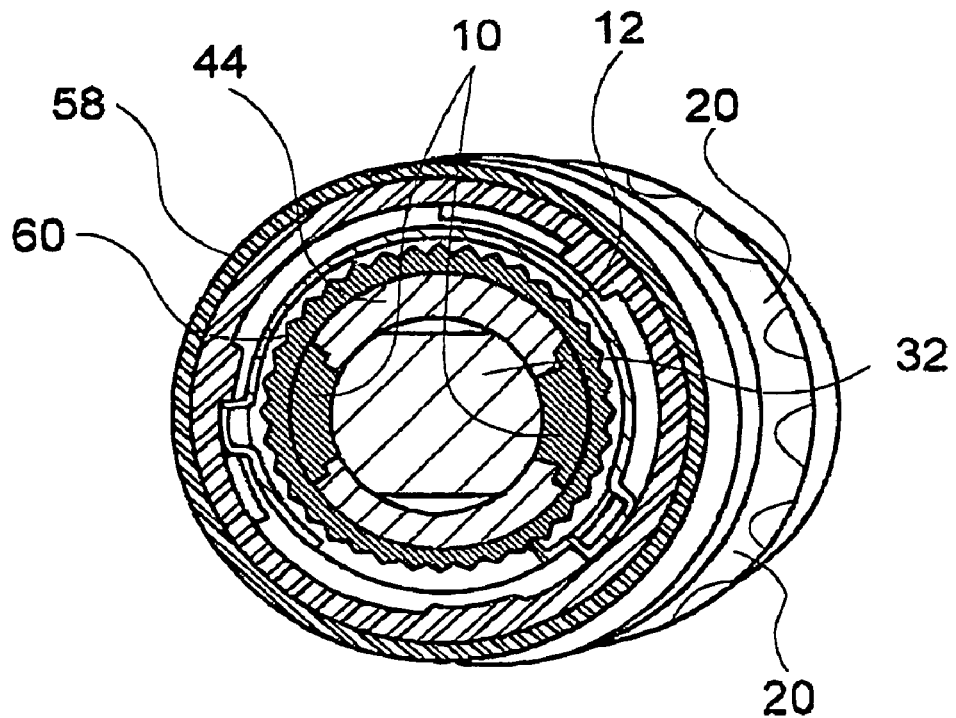
FIG. 7, a cross section through the quick-action chuck of FIG. 5, with the actuating element rotated farther by 90° clockwise.

As soon as a moment acting on the spring element 12 exceeds a preset, structural magnitude, the edge 74 presses the detent element 16 downward in the direction of the base body 32, and the lug 86 is thrust along the detent element 14. As a result, a fingerlike detent element 18 of the spring means 12 engages a locking engagement 60 in the fixation bush 36, and the spring means 12 interlocks with the fixation bush 36. At the same time, from this position on, upon further rotation, the actuating element 20 is secured via the contact of the detent element 14 with the edge 80 of the lug 76. This is shown in FIG. 7 analogously to FIG. 5, with the elements now rotated approximately 90° with respect to the base body 32.

Figure 8:
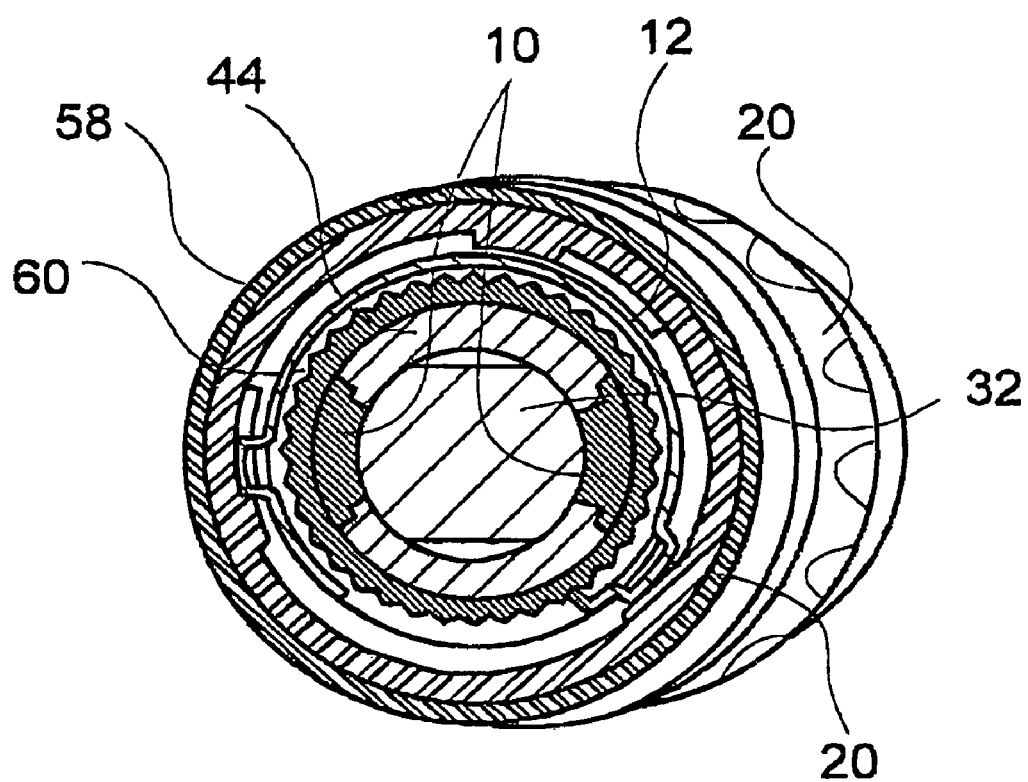
FIG. 8, a cross section through the quick-action chuck with the tool locked and chucked.

The terminal position of the elements and of the actuating element 20 upon chucking of the tool 34 is shown in FIG. 8. The locking devices 10 have interlocked with the base body 32, and the spring element 12 secures the actuating element 20.

For releasing the quick-action chuck, the actuating element 20 is rotated clockwise, viewed in the direction of the free end of the quick-action chuck. The securing of the actuating element 20 is undone, and the edge 80 of the lug 76 snaps onto the detent element 14. The lug 86 releases the second detent element 16, and the detent element 18 moves out of engagement with the fixation bush 36. The chucking bush 50 rotates relative to the fixation bush 36, and the chucking is undone. The locking spring 22 snaps into the groove 66, and the locking of the locking devices 10 is undone; these locking devices are thrust along the slide face 64 of the base body 32.

FIG. 9 shows a preferred base body 32. The base body 32 has a cylindrical region, part of whose circumference is provided with a set of teeth 48 with which locking devices 10, not shown, can mesh. The cylindrical region moreover has at least one slide face 64, which is flattened and provided with a smooth surface. On the side of the base body 32 away from the observer, on the other side of the cylindrical region, a further such slide face 64 is provided, so that for instance two locking devices 10 may be provided.

Figure 10:
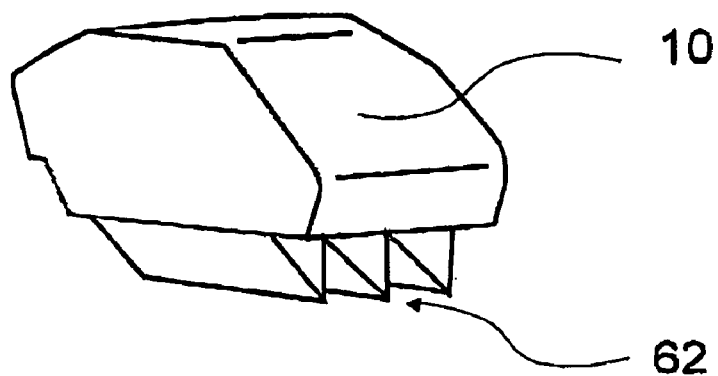
FIG. 10, an elevation view of a preferred locking element.

FIG. 10 shows a preferred locking device 10. On its side toward a base body 32, not shown, it has a set of teeth 62, with which the locking device 10 can mesh with a set of teeth 48 of the base body 32.

LIST OF REFERENCE NUMERALS

10 Locking device
12 Spring means
14 Detent element
16 Detent element
18 Detent element
20 Actuating element
22 Locking spring
24 Spring element
26 Chucking jaws
28 Groove
30 Lug
32 Base body
34 Tool
36 Fixation bush
38 Protrusion
40 Finger
42 Guide bush
44 Retaining ring
46 Securing ring
48 Set of teeth
50 Chucking bush
52 Axial bearing
58 Covering bush
60 Locking engagement
62 Set of teeth
64 Slide face
66 Groove
68 Groove
70 Groove
72 Groove
74 Edge
76 Lug
78 Edge
80 Edge
82 Stop
84 Stop
86 Lug

The invention claimed is:

1. A quick-action chuck, comprising:
an actuating element (20); and
a control device which includes at least one means (12, 22, 36, 42, 50) for controlling at least one locking device (10) that serves to absorb a chucking reinforcement force, wherein via the at least one locking device (10) that is controllable by the control device, a positive-engagement connection can be brought about for absorbing the chucking reinforcement force, wherein the at least one locking device (10) is rotatable relative to a base body (32) for bringing about the positive-engagement connection, wherein chucking jaws (26) are guided in the base body (32), wherein said base body (32) has at least one slide face (64) on which the at least one locking device (10) is axially displaceable, wherein said base body has a set of teeth (48) in which the at least one locking device (10) engages in a locking position, and wherein as a result of meshing with the set of teeth (48), the at least one locking device (10) is axially fixed on the base body (32).

2. The quick-action chuck of claim 1, wherein the control device is a locking spring (22).

3. The quick-action chuck of claim 2, wherein the actuating element (20) can be coupled to the base body (32) and uncoupled from it via the locking spring (22).

4. The quick-action chuck of claim 2, wherein the locking spring (22) has an essentially annular shape.

5. The quick-action chuck of claim 1, wherein a tool (34) can be chucked indirectly via a spring means (12) that is actuatable by the actuating element (20).

6. The quick-action chuck of claim 5, wherein the spring means (12), for chucking the tool (34), has an essentially annular shape.

7. The quick-action chuck of claim 6, wherein the spring means (12) has at least two detent elements (14, 16), opposite one another on the circumference, for snapping into the actuating element (20).

8. The quick-action chuck of claim 1, wherein the actuating element (20) can be operatively uncoupled from the locking device (10) over at least one actuation region.

9. The quick-action chuck of claim 1, wherein the actuating element (20) is rotatably supported for chucking the tool (34).

10. The quick-action chuck of claim 1, wherein the actuating element (20) is supported displaceably in the axial direction.

11. The quick-action chuck of claim 1, further comprising at least one chucking jaw (26), which is loaded in an axial direction in at least one operating position via a spring element (24).

12. A power tool having a quick-action chuck, said quick-action chuck comprising:

an actuating element (20); and a control device which includes at least one means (12, 22, 36, 42, 50) for controlling at least one locking device (10) that serves to absorb a chucking reinforcement force, wherein via the at least one locking device (10) that is controllable by the control device, a positive-engagement connection can be brought about for absorbing the chucking reinforcement force, wherein the at least one locking device (10) is rotatable relative to a base body (32) for bringing about the positive-engagement connection, wherein chucking jaws (26) are guided in the base body (32), wherein said base body (32) has at least one slide face (64) on which the at least one locking device (10) is axially displaceable, wherein said base body (32) has a set of teeth (48) in which the at least one locking device (10) engages in a locking position, and wherein as a result of meshing with the set of teeth (48), the at least one locking device (10) is axially fixed on the base body (32).

* * * * *